(12) United States Patent
Kikuchi

(10) Patent No.: US 8,581,839 B2
(45) Date of Patent: Nov. 12, 2013

(54) DISPLAY DEVICE AND DISPLAY METHOD

(75) Inventor: Yosuke Kikuchi, Fuchu (JP)

(73) Assignee: Seiko Epson Corporation, Tokyo (JP)

( * ) Notice: Subject to any disclaimer, the term of this patent is extended or adjusted under 35 U.S.C. 154(b) by 230 days.

(21) Appl. No.: 13/107,277

(22) Filed: May 13, 2011

(65) Prior Publication Data

US 2011/0279362 A1  Nov. 17, 2011

(30) Foreign Application Priority Data

May 17, 2010  (JP) .................................. 2010-112787

(51) Int. Cl.
*G09G 5/00* (2006.01)

(52) U.S. Cl.
USPC ......................................................... 345/156

(58) Field of Classification Search
USPC ................................................. 345/156, 690
See application file for complete search history.

(56) References Cited

U.S. PATENT DOCUMENTS

| | | | |
|---|---|---|---|
| 6,633,930 B2 * | 10/2003 | Sonehara et al. | 710/62 |
| 7,164,410 B2 * | 1/2007 | Kupka | 345/156 |
| 7,675,530 B2 * | 3/2010 | Koresawa et al. | 345/690 |
| 8,162,754 B2 * | 4/2012 | Asami | 463/36 |
| 2001/0011992 A1 * | 8/2001 | Juen et al. | 345/156 |
| 2002/0015019 A1 * | 2/2002 | Kinjo | 345/156 |
| 2003/0011563 A1 * | 1/2003 | Wada | 345/156 |
| 2010/0013757 A1 * | 1/2010 | Ogikubo | 345/156 |

FOREIGN PATENT DOCUMENTS

| | | |
|---|---|---|
| JP | A-2001-22519 | 1/2001 |
| JP | A-2003-58901 | 2/2003 |

* cited by examiner

*Primary Examiner* — Fred Tzeng
(74) *Attorney, Agent, or Firm* — Oliff & Berridge, PLC

(57) ABSTRACT

A display device and the like which can provide an image showing the status of the past presentation more flexibly is provided. A display device includes an image generating section generating an instruction image which reflects an instruction content based on presentation data obtained by relating image data showing a displayed image to display time data showing a display time of the displayed image and based on instruction information showing the instruction content, a display section displaying the instruction image, and an updating section updating the presentation data based on the instruction, and the image generating section generates a reproduction target time specifying image including a time region which changes as time passes and a specifying region which moves on the time region according to an instruction position and shows a reproduction target time, and the display section displays the reproduction target time specifying image.

7 Claims, 8 Drawing Sheets

DISPLAY DEVICE AND DISPLAY METHOD

BACKGROUND

1. Technical Field

The present invention relates to display devices and display methods.

2. Related Art

For example, in JP-A-2003-58901 (Patent Document 1), a method for recording what is going on in a conference or the like and reproducing the images thereof is described. More specifically, to record what is going on in a presentation with a small amount of data and reproduce the images thereof, the method makes a presentation recording and reproducing device record slide page scrolling, the trajectory of a cursor on a slide, and sound as a presentation file, and reproduce what happened in the presentation on a presentation file-by-presentation file basis.

However, with the method described in Patent Document 1, reproduction is performed on a presentation file-by-presentation file basis. This makes it difficult, for example, to restore what is written on a whiteboard or the like to the past state during the conference.

SUMMARY

An advantage of some aspects of the invention is to provide a display device and a display method which can provide an image showing the status of the past presentation more flexibly by solving the problem described above.

A display device according to an aspect of the invention includes: an image generating section generating an instruction image which reflects an instruction content based on presentation data obtained by relating image data showing a displayed image to display time data showing a display time of the displayed image and based on instruction information showing the instruction content; a display section displaying the instruction image; and an updating section updating the presentation data based on information showing the instruction image, the image generating section generates a reproduction target time specifying image including a time region which changes as time passes and a specifying region which moves on the time region according to an instruction position shown by the instruction information, the specifying region showing a reproduction target time of the image data, and the display section displays the reproduction target time specifying image.

A display method according to another aspect of the invention is directed to a method including allowing a display device to generate an instruction image which reflects an instruction content based on presentation data obtained by relating image data showing a displayed image to display time data showing a display time of the displayed image and based on instruction information showing the instruction content, display the instruction image, update the presentation data based on information showing the instruction image, generate a reproduction target time specifying image including a time region which changes as time passes and a specifying region which moves on the time region according to an instruction position of an instruction tool, the specifying region showing a reproduction target time, and display the reproduction target time specifying image.

According to the aspect of the invention, the display device accepts the specification of the reproduction target time by using the specifying region which moves on the time region, whereby the display device can provide an image showing the status of the past presentation more flexibly.

Moreover, the image generating section may generate an image including, as the time region in the reproduction target time specifying image, a first time region whose size changes according to a reproduction time of a presentation before update by the updating section and a second time region whose size changes according to the reproduction time of the presentation after update by the updating section. As a result, the display device allows the user to specify the reproduction target time more easily by changing the size of the image according to the reproduction time.

Furthermore, the image generating section may generate the reproduction target time specifying image showing the second time region in such a way as to branch off from a position of the first time region, the position indicating a time point at which update was performed. As a result, since the display device can display the reproduction target time specifying image showing the second time region in such a way as to branch off from a position of the first time region, the position indicating a time point at which update was performed, the user can grasp the update time easily.

In addition, the image generating section may generate the displayed image from the reproduction target time, and the display section may display the displayed image. As a result, since the display device can display an image from the reproduction target time, the display device can provide an image showing the status of the past presentation more flexibly.

Moreover, the instruction information may be information showing an instruction content given by using an instruction tool. As a result, the display device can display an instruction image which reflects the instruction content given by using the instruction tool in accordance with the specification of the reproduction target time.

Furthermore, the image data may include data showing a content of writing performed by an instruction tool in a display region of the instruction image, the display time data may include data showing a time point at which the content of writing was written, and the image generating section may generate an image showing the content of writing as part of the displayed image from the reproduction target time. As a result, the display device can display a content of writing performed at a specified reproduction target time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of a projector to which the invention is applied will be described with reference to the drawings. It should be understood that the embodiment described below is not meant to limit the scope of the invention claimed in the appended claims in any way, and all the configurations described in the embodiment are not always necessary for means for solving the problems of the invention claimed in the appended claims.

First Embodiment

Figure 1:
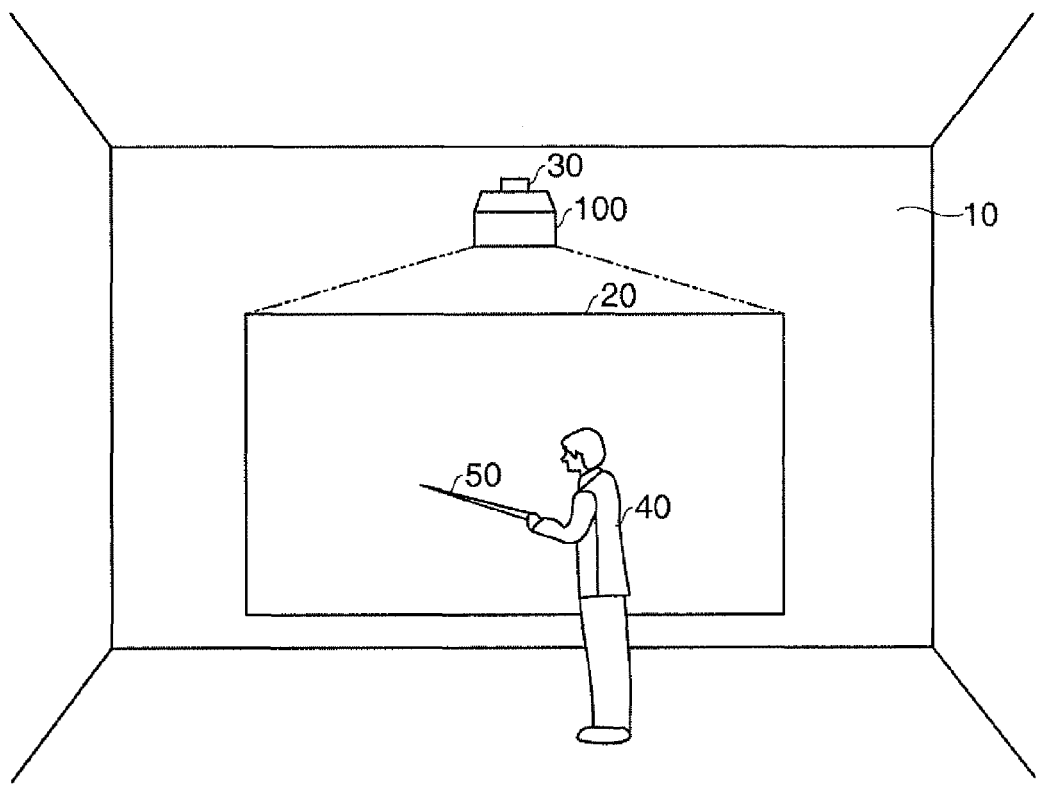
FIG. 1 is a diagram showing an example of a projection status in a first embodiment.

FIG. 1 is a diagram showing an example of a projection status in a first embodiment. For example, in a conference room, a presenter 40 is making a presentation by using an instruction stick 50 which is a type of instruction tool having a light-emitting function. In an upper part of a wall 10 in the conference room, a single focus projector 100 is attached by fittings 30. The projector 100 which is a type of display device is projecting an image 20 onto the wall 10 which is a type of projection target region.

Figure 2:
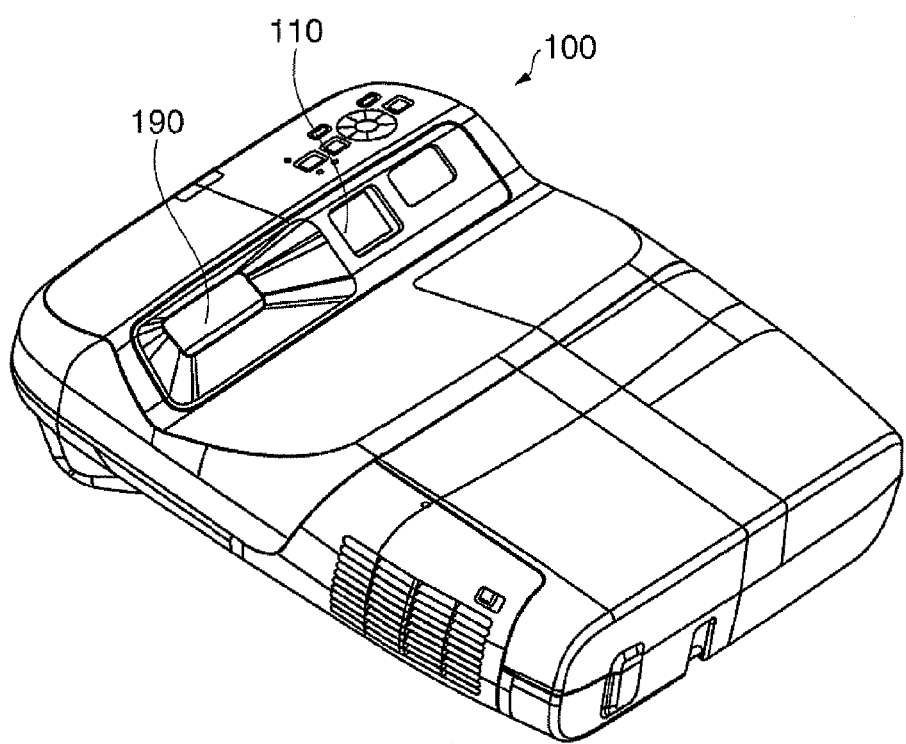
FIG. 2 is an appearance diagram of a projector in the first embodiment.

FIG. 2 is an appearance diagram of the projector 100 in the first embodiment. The projector 100 of FIG. 2 shows a state in which the projector 100 installed in FIG. 1 is turned upside down (a state in which the bottom face of the projector 100 becomes the top face thereof). In an inclined face which faces the wall 10, the inclined face in the bottom face of the projector 100, a projecting section 190 and an image-taking section 110 are provided. This allows the projecting section 190 which is a type of display section to project the image 20 onto the wall 10 and the image-taking section 110 to take an image of the image 20 projected on the wall 10.

Figure 3:
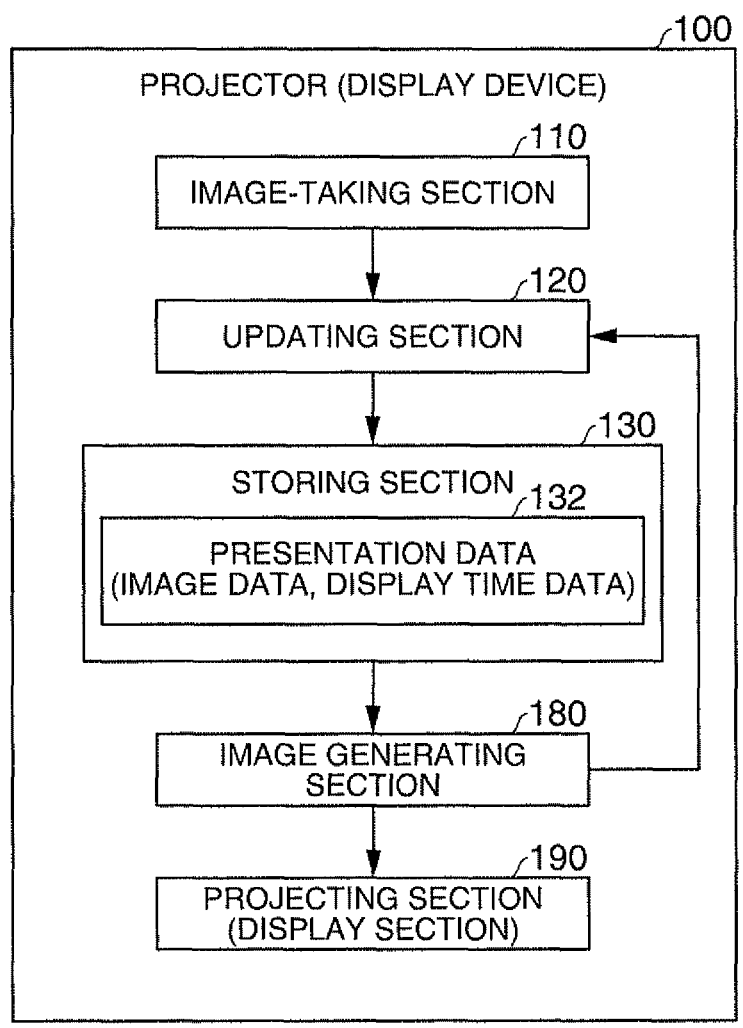
FIG. 3 is a functional block diagram of the projector in the first embodiment.

Next, functional blocks of the projector 100 will be described. FIG. 3 is a functional block diagram of the projector 100 in the first embodiment. The projector 100 includes the image-taking section 110 generating taken-image information showing a taken image, a storing section 130 storing presentation data 132 or the like, an updating section 120 updating the presentation data 132 based on the taken-image information, an image generating section 180 generating the image 20 based on the presentation data 132, and the projecting section 190 projecting the image 20.

Incidentally, the presentation data 132 is the data obtained by relating image data showing a displayed image (for example, data showing a color, data showing a brightness value, data showing a control instruction for generating an image, and the like) to display time data showing a display time (for example, the display date and time, the time of display, the time elapsed after the start of the presentation, and the like) of the displayed image. Moreover, the taken-image information includes instruction information showing an instruction content and information showing an instruction image which reflects the instruction content.

Figure 4:
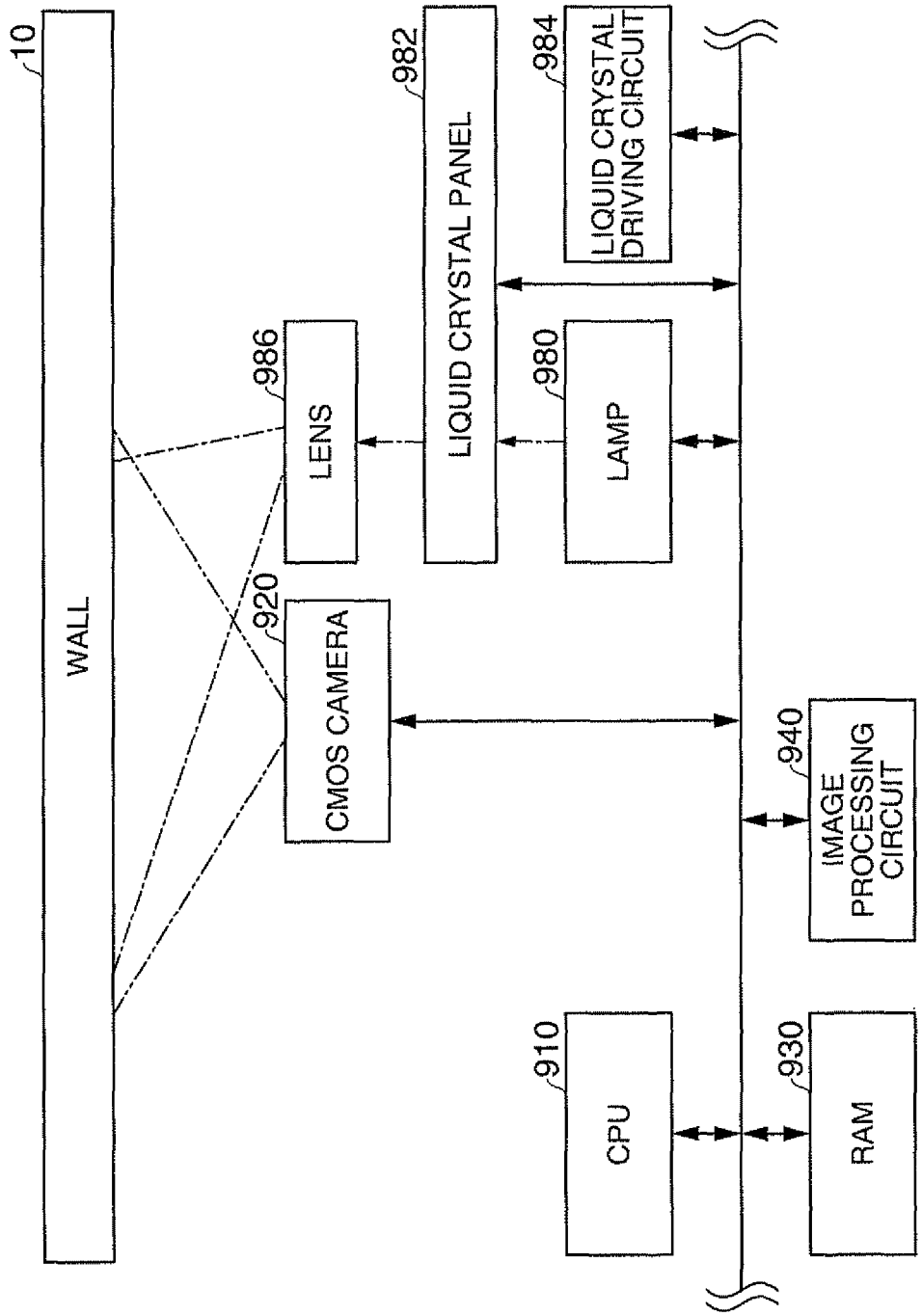
FIG. 4 is a hardware block diagram of the projector in the first embodiment.

Moreover, the projector 100 may function as each of these sections by using the following hardware. FIG. 4 is a hardware block diagram of the projector 100 in the first embodiment. For example, the projector 100 may use a CMOS camera 920 or the like as the image-taking section 110, a CPU 910 or the like as the updating section 120, RAM 930 or the like as the storing section 130, the CPU 910, an image processing circuit 940, and the like as the image generating section 180, and a lamp 980, a liquid crystal panel 982, a liquid crystal driving circuit 984, a lens 986, and the like as the projecting section 190.

Figure 5:
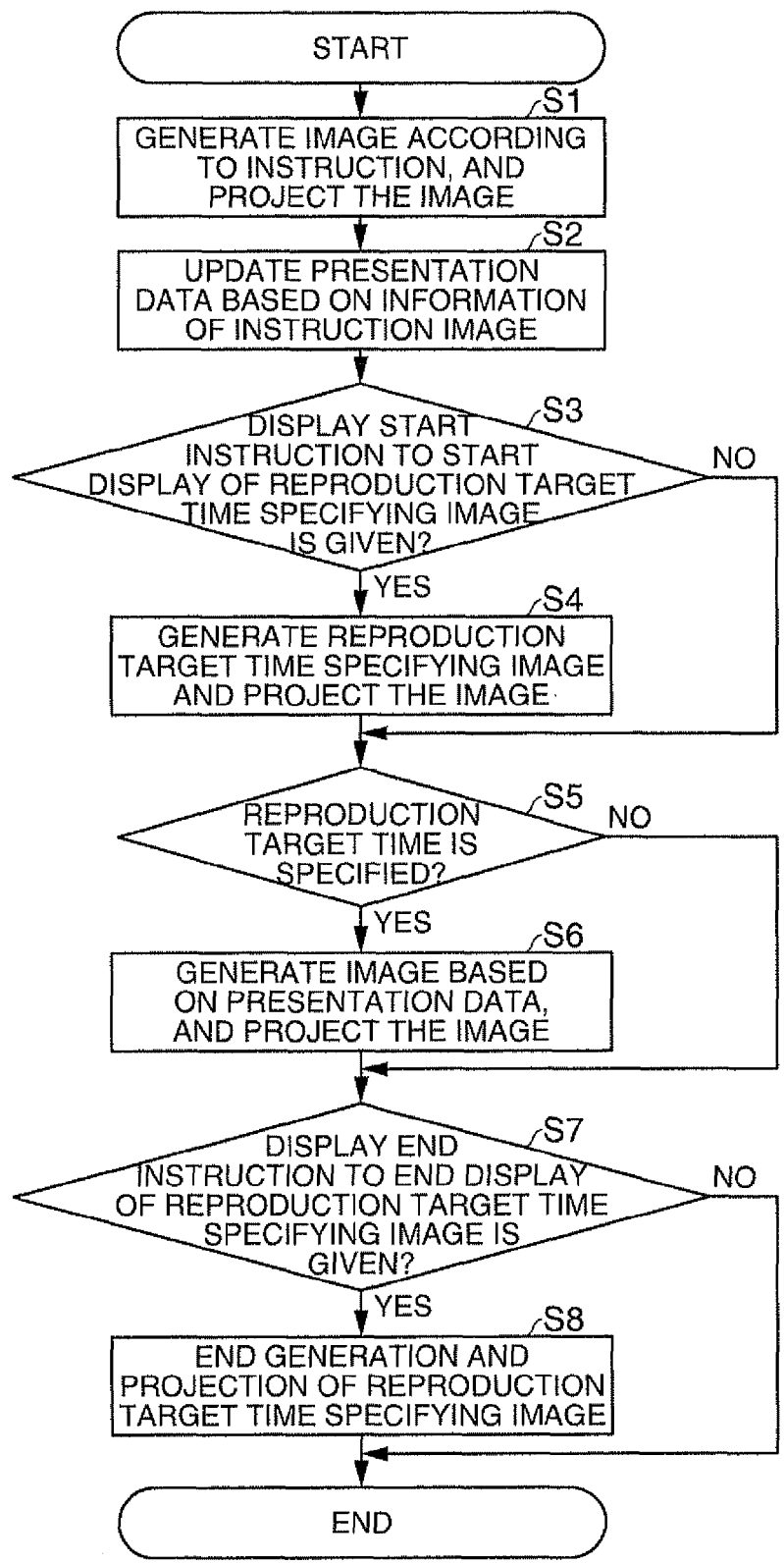
FIG. 5 is a flowchart showing a projection procedure in the first embodiment.
Figure 6:
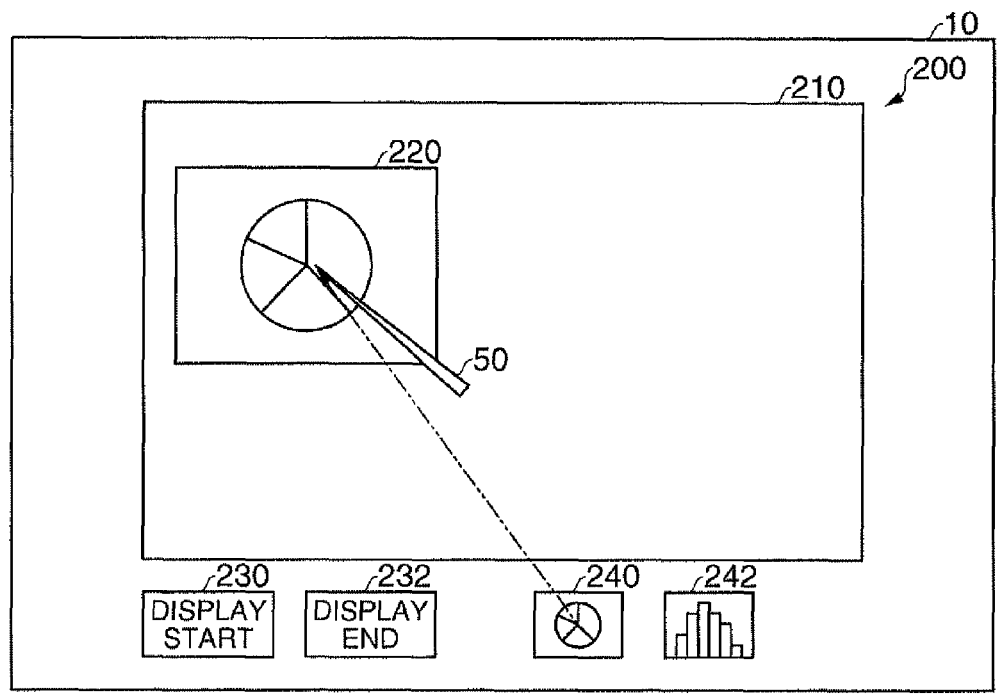
FIG. 6 is a diagram showing an example of an image in the first embodiment.

Next, a projection procedure by which the image 20 is projected in this embodiment will be described. FIG. 5 is a flowchart showing the projection procedure in the first embodiment. Moreover, FIG. 6 is a diagram showing an example of an image 200 in the first embodiment. The image generating section 180 generates an image according to an instruction based on the presentation data 132, and the projecting section 190 projects the generated image (step S1). For example, the image 200 projected by the projecting section 190 includes, as a main image, an instruction image 210 showing an image according to the instruction, and includes, as a subimage, an image 230 for instructing to start display of a specifying image for specifying a reproduction target time of image data, an image 232 for instructing to end display of the specifying image, an image 240 which is a reduced-size image of an image which is input via a first terminal (for example, an HDMI terminal, a USB terminal, a PC terminal, or the like), and an image 242 which is a reduced-size image of an image which is input via a second terminal (for example, an HDMI terminal, a USB terminal, a PC terminal, or the like).

The presenter 40 places the tip of the instruction stick 50 on the image 240 for a few seconds and then moves the tip of the instruction stick 50 on the instruction image 210, whereby the presenter 40 can display an image 220 which is an enlarged image of the image 240 in a position in the instruction image 210 to which the image 240 is moved. More specifically, the image generating section 180 can grasp the movement of the instruction stick 50 by comparing a change in the light-emitting position at the tip of the instruction stick 50, the change included in the taken-image information from the image-taking section 110, and the position of the image 240 or the like indicated by the presentation data 132, and generate the instruction image 210 according to the movement.

Figure 7:
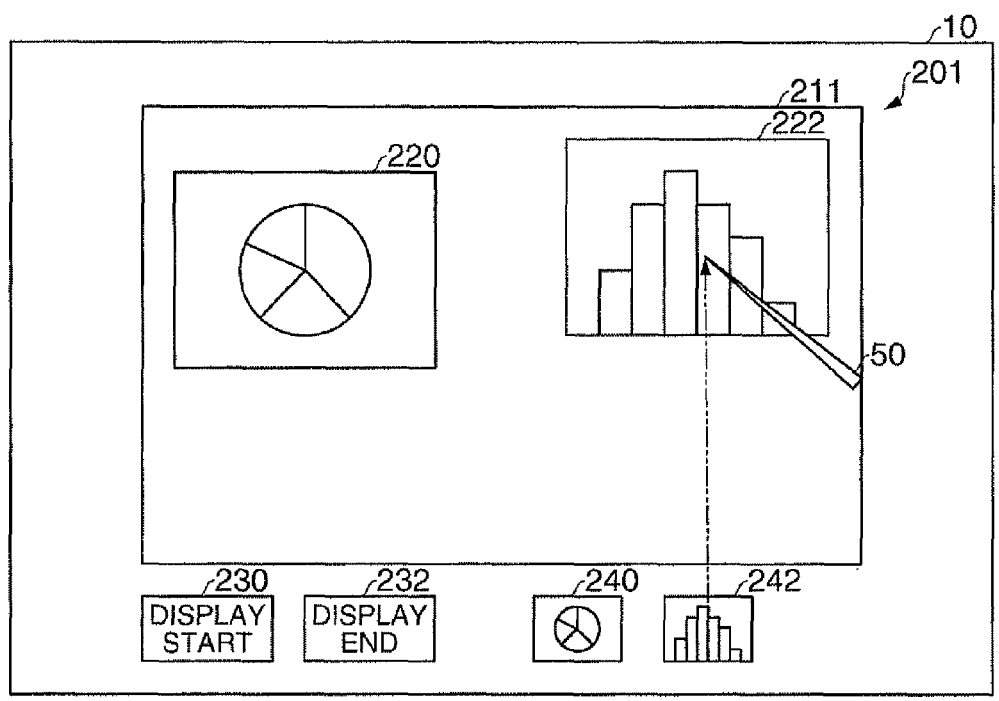
FIG. 7 is a diagram showing another example of an image in the first embodiment.

FIG. 7 is a diagram showing another example of an image 201 in the first embodiment. The presenter 40 places the tip of the instruction stick 50 on the image 242 for a few seconds in a state shown in FIG. 6 and then moves the tip of the instruction stick 50 to the instruction image 211, whereby the presenter 40 can display an image 222 which is an enlarged image of the image 242 in a position in the instruction image 211 to which the image 242 is moved.

Figure 8:
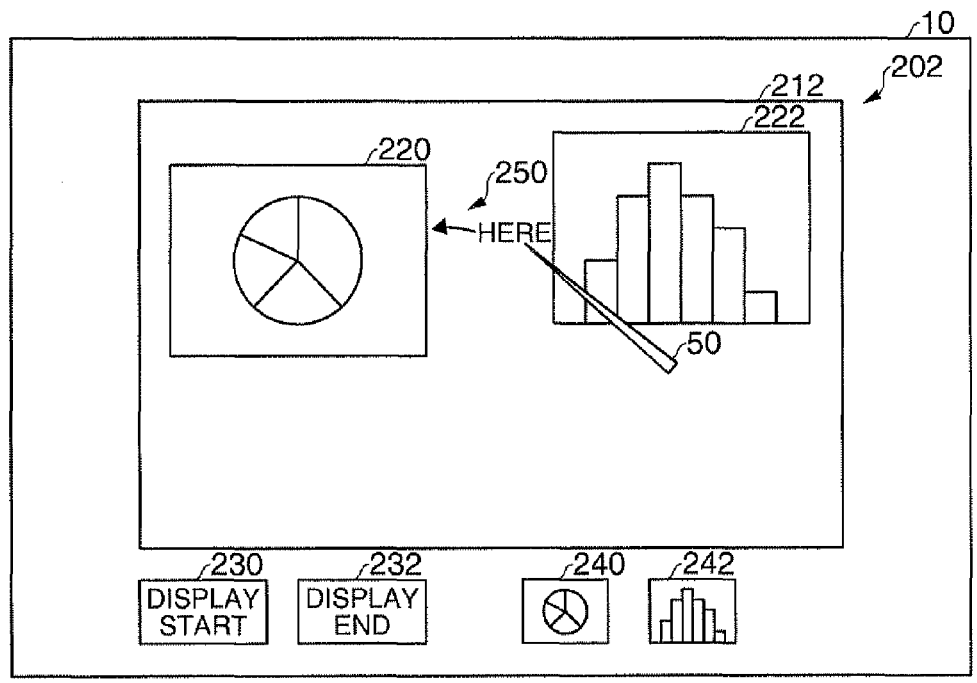
FIG. 8 is a diagram showing another example of an image in the first embodiment.

FIG. 8 is a diagram showing another example of an image 202 in the first embodiment. The presenter 40 places the tip of the instruction stick 50 in an empty space in an instruction image 212 for a few seconds in a state shown in FIG. 7 and then moves the tip of the instruction stick 50, whereby the presenter 40 can display an image 250 showing the trajectory of the movement of the tip of the instruction stick 50 in the instruction image 212. More specifically, the image generating section 180 can grasp the movement of the instruction stick 50 by comparing a change in the light-emitting position of the instruction stick 50, the change included in the taken-image information from the image-taking section 110, and the position of the image 220 or the like indicated by the presentation data 132, and generate, according to the movement, the instruction image 250 showing the content of writing performed by the instruction stick 50.

The updating section 120 updates the presentation data 132 based on the information of the instruction images 210 to 212 generated by the image generating section 180 (step S2). The image generating section 180 determines whether or not a display start instruction to start display of a reproduction target time specifying image is given based on the taken-image information (step S3). If a display start instruction to start display of a reproduction target time specifying image is given, the image generating section 180 generates the reproduction target time specifying image, and the projecting section 190 projects the reproduction target time specifying image (step S4).

Figure 9:
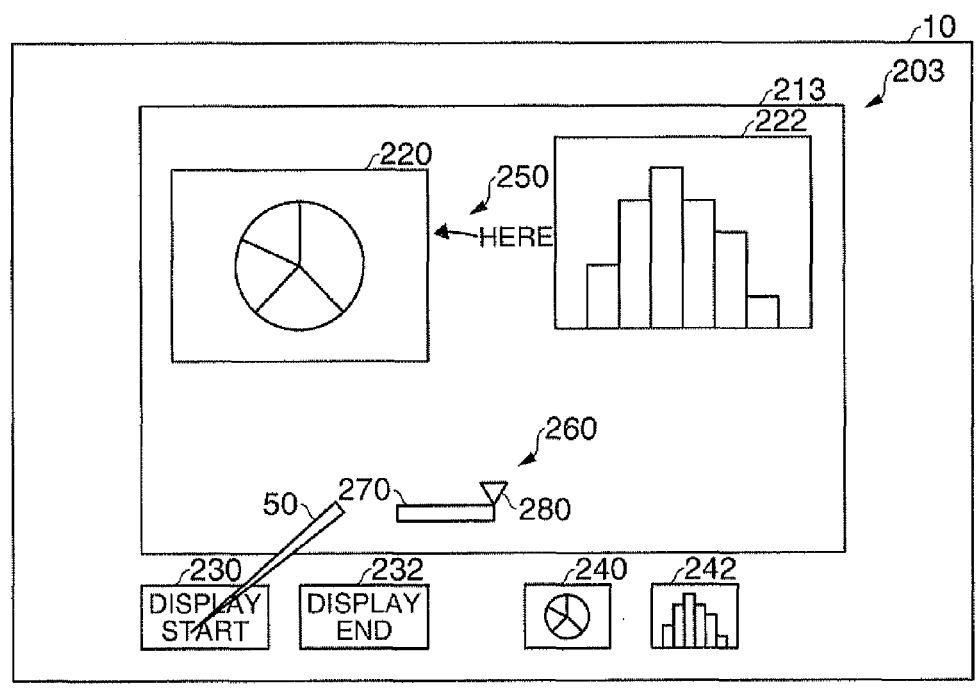
FIG. 9 is a diagram showing another example of an image in the first embodiment.

FIG. 9 is a diagram showing another example of an image 203 in the first embodiment. For example, the presenter 40 places the tip of the instruction stick 50 on the image 230 for giving a display start instruction to start display of a reproduction target time specifying image 260 for a few seconds in a state shown in FIG. 8, and thereby gives a display start instruction to start display of the reproduction target time specifying image 260. The reproduction target time specifying image 260 includes a bar-like time image (time region) 270 which gets longer rightward as time passes and an inverted triangular specifying image (specifying region) 280 which is an image for specifying a reproduction target time (for example, the display date and time of the displayed image, the time of display, and the time elapsed after the start of the presentation) which moves on the time image 270 according to the instruction position of the instruction stick 50. The image generating section 180 generates the image 203 including an instruction image 213 showing the reproduction target time specifying image 260 in an empty space according to the display start instruction. Incidentally, although the reproduction target time specifying image 260 is displayed in an empty space in the instruction image 213, the reproduction target time specifying image 260 is not an object to be reproduced in accordance with the specification of a reproduction target time.

Figure 10:
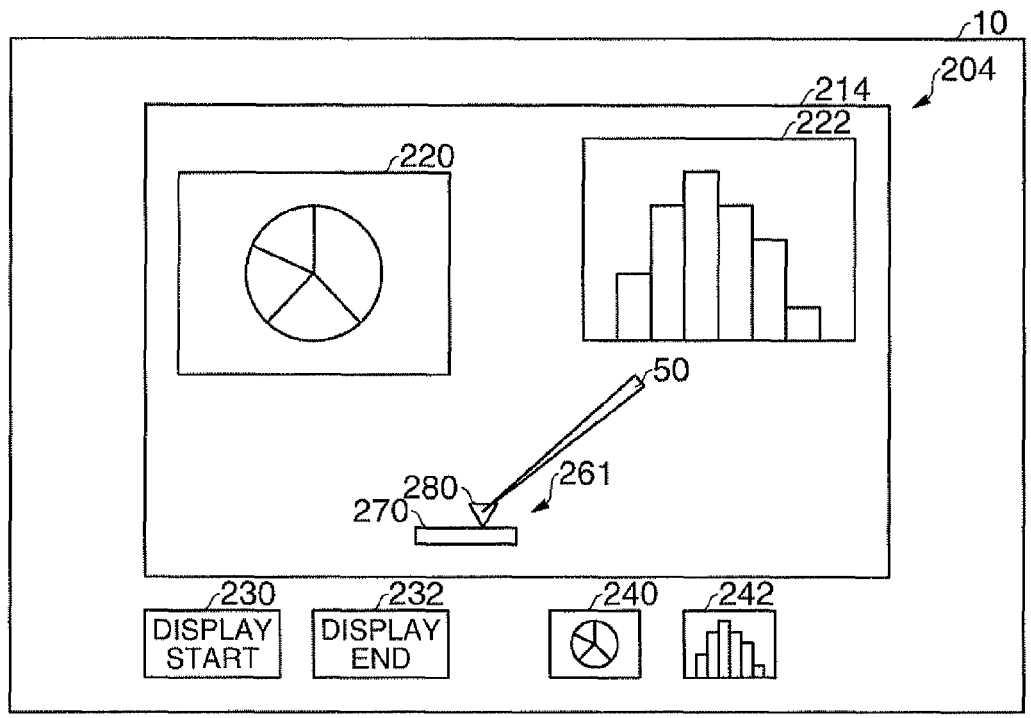
FIG. 10 is a diagram showing another example of an image in the first embodiment.
Figure 11:
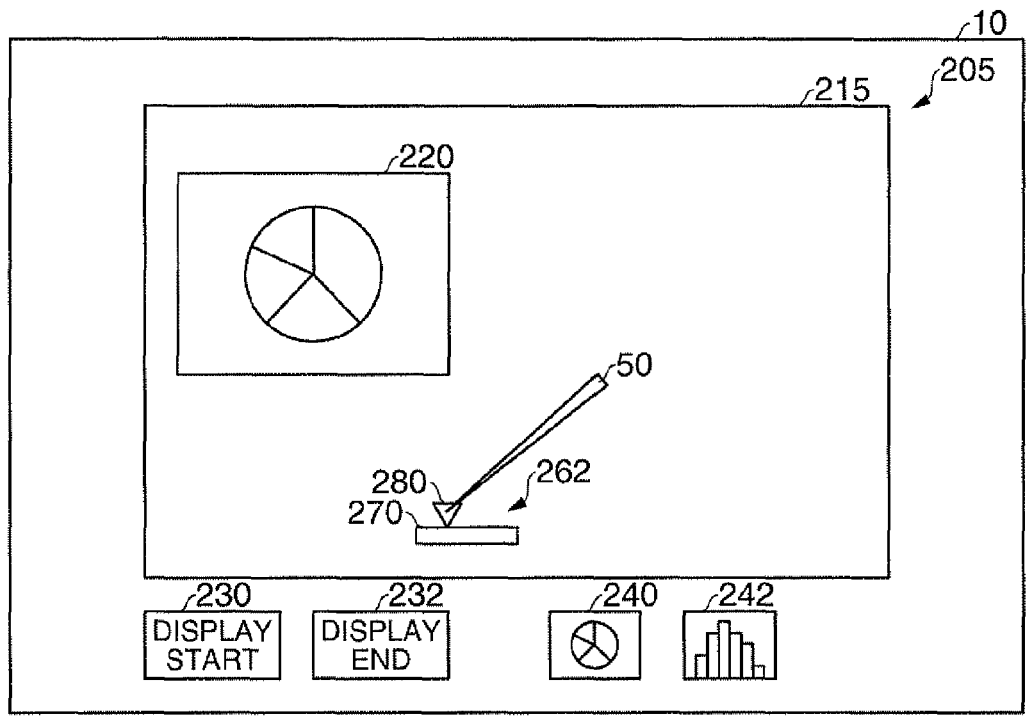
FIG. 11 is a diagram showing another example of an image in the first embodiment.

FIG. 10 is a diagram showing another example of an image 204 in the first embodiment. Moreover, FIG. 11 is a diagram showing another example of an image 205 in the first embodiment. The presenter 40 places the tip of the instruction stick 50 on the specifying image 280 for a few seconds in a state in which the reproduction target time specifying image 260 is displayed and then moves the tip of the instruction stick 50 to the left, whereby the presenter 40 can restore the display of an instruction image 214 to the past state. The image generating section 180 determines whether or not the reproduction target time is specified by determining the movement of the specifying image 280 based on the taken-image information (step S5). If the reproduction target time is specified, the image generating section 180 generates an image in the past reproduction target time based on the presentation data 132, and the projecting section 190 projects the generated image (step S6).

For example, it is assumed that the instruction image becomes the instruction image 210 of FIG. 6 after seconds have elapsed since the start of the presentation, becomes the instruction image 211 of FIG. 7 after 20 seconds have elapsed since the start of the presentation, and becomes the instruction image 212 of FIG. 8 after 30 seconds have elapsed since the start of the presentation. For example, when the presenter 40 moves the tip of the instruction stick 50 placed on the specifying image 280 a distance corresponding to 10 seconds to the left in a state in which the image 203 including the instruction image 213 of FIG. 9 is displayed, the image generating section 180 generates the image 204 in which a reproduction target time specifying image 261 with the specifying image 280 moved to the left a distance corresponding to 10 seconds is displayed in the instruction image 214. Moreover, for example, when the presenter 40 moves the tip of the instruction stick placed on the specifying image 280 a distance corresponding to 20 seconds to the left in a state in which the image 203 including the instruction image 213 of FIG. 9 is displayed, the image generating section 180 generates the image 205 in which a reproduction target time specifying image 262 with the specifying image 280 moved to the left a distance corresponding to 20 seconds is displayed in the instruction image 215.

Furthermore, when the presenter 40 gives a new instruction in a state in which such a reproduction target time is specified, the image generating section 180 generates an image according to the instruction (step S1), and the updating section 120 updates the presentation data 132 based on the information of the instruction image generated by the image generating section 180 (step S2). Moreover, when the presenter 40 gives a new instruction in a state in which the reproduction target time specifying images 260 to 262 are displayed and an instruction to specify a reproduction target time is given, the image generating section 180 generates, based on the presentation data 132, a reproduction target time specifying image including a first time region corresponding to the presentation before update by the updating section 120 and a second time region corresponding to the presentation after update by the updating section 120.

Figure 12:
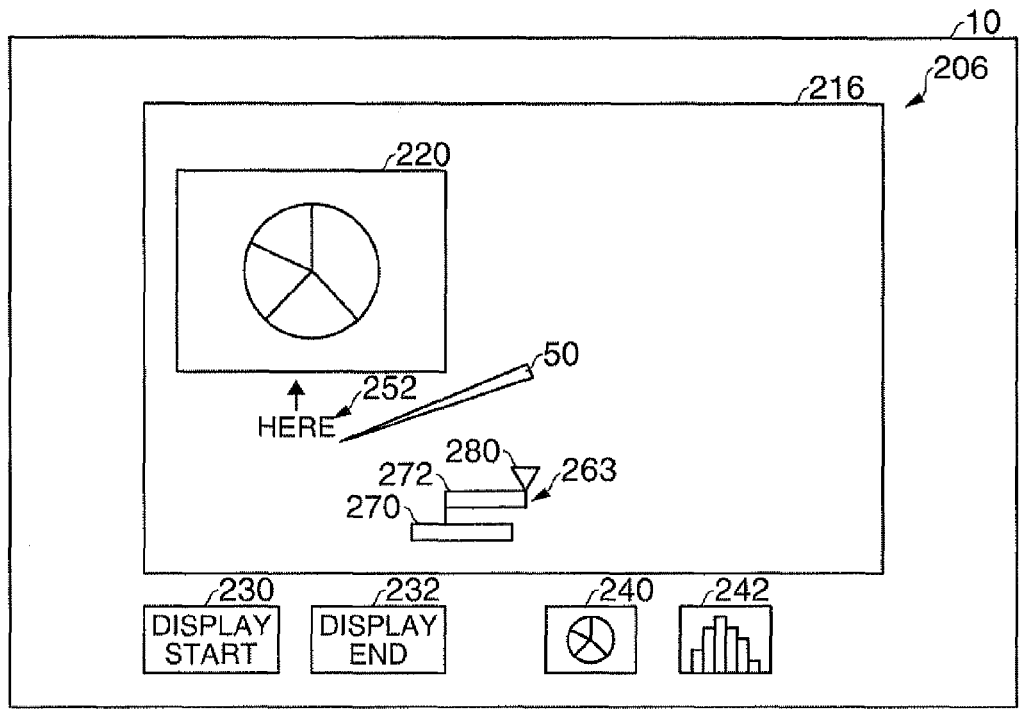
FIG. 12 is a diagram showing another example of an image in the first embodiment.

FIG. 12 is a diagram showing another example of an image 206 in the first embodiment. For example, when the presenter 40 newly performs writing by using the instruction stick 50, the image generating section 180 generates an instruction image 216 including an image 252 showing the content of writing, and the projecting section 190 projects an image 206 including the instruction image 216. Moreover, in this case, the image generating section 180 generates a reproduction target time specifying image 263 in an empty space in the instruction image 216. The reproduction target time specifying image 263 includes a time image (a first time region) 270 corresponding to the presentation before update by the updating section 120 and a time image (a second time region) 272 corresponding to the presentation after update by the updating section 120. Furthermore, the time image 272 is placed above the time image 270 in such a way as to branch off from a position of the time image 270, the position indicating the time point at which update was performed, and the specifying image 280 is placed at the right end of the time image 272. Incidentally, as time passes in the presentation, the time image 272 gets longer to the right, and the specifying image 280 moves to the right.

Figure 13:
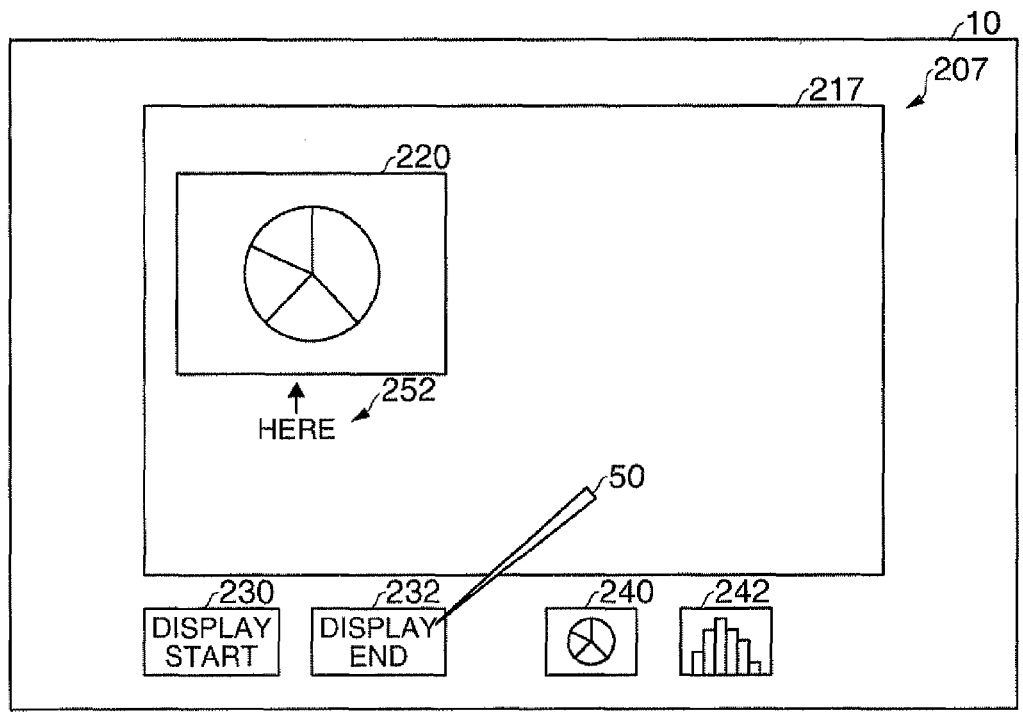
FIG. 13 is a diagram showing another example of an image in the first embodiment.

Moreover, the image generating section 180 determines whether or not a display end instruction to end display of the reproduction target time specifying images 260 to 263 is given based on the taken-image information (step S7). If a display end instruction to end display of the reproduction target time specifying images 260 to 263 is given, the image generating section 180 ends generation of the reproduction target time specifying images 260 to 263 and the projecting section 190 ends projection of the reproduction target time specifying images 260 to 263 (step S8). FIG. 13 is a diagram showing another example of an image 207 in the first embodiment. For example, as shown in FIG. 13, the presenter 40 places the tip of the instruction stick 50 on the image 232 for giving a display end instruction to end display of the reproduction target time specifying images 260 to 263 for a few seconds in a state shown in FIG. 12 etc., and thereby gives a display end instruction to end display of the reproduction target time specifying images 260 to 263.

As described above, according to this embodiment, the projector 100 can provide an image indicating the status of the past presentation more flexibly by accepting the specification of the reproduction target time by using the specifying image 280 which moves on the time images 270 and 272. Moreover, according to this embodiment, the projector 100 allows the presenter 40 to specify the reproduction target time more easily by changing the sizes of the time images 270 and 272 according to the reproduction time. Furthermore, according to this embodiment, since the projector 100 can display the time image 272 in such a way as to branch off from a position of the time image 270, the position indicating the time point at which update was performed, the presenter 40 can easily grasp the time point at which update was performed.

In addition, according to this embodiment, since the projector 100 can display the displayed image from the specified reproduction target time, it is possible to provide an image indicating the status of the past presentation including the content of writing etc. more flexibly. Moreover, according to this embodiment, the presenter 40 can make a presentation by using only the instruction stick 50 without using a PC (personal computer), a whiteboard, or the like.

Other Embodiments

Incidentally, the application of the invention is not limited to the embodiment described above, and modifications are possible. For example, the projector 100 may store the presentation data 132 showing a taken image including the presenter 40 and the instruction stick 50 and reproduce the taken image. Moreover, the shape of the time image (the time region) is not limited to a bar-like shape and may be a circular shape or the like. The time image is not limited to an image whose shape changes as time passes. For example, the time image may be an image whose color or pattern changes as time passes. The direction in which the shape of the time image changes is not limited to a right-hand direction and may be a left-hand direction, a downward direction, or the like. In addition, the number of time images is not limited to that described in the above embodiment, and three or more time images may be provided. Furthermore, the application of the invention is not limited to use by a plurality of users and may be use by one user. Specifically, for example, the time region may be a circular scheduled/actual act image showing a personal schedule for one day and the actual act in the day, and the specifying region may be a rectangular image or the like which moves around the circular scheduled/actual act image. In this case, for example, a PC which functions as a display device may display an image (a displayed image) showing a question on a screen, information showing an option selected by the user from a plurality of options may be input thereto as instruction information, and the PC may display, as an instruction image, a result image showing whether or not the option thus selected is correct, an image showing the obtained point, and the like. Moreover, according to the instruction given by the user, the PC may display an image showing a question at a time point at which the instruction was given, a result image, and the like.

Furthermore, the instruction tool is not limited to the instruction stick 50 and may be, for example, an instruction stick having a light-emitting section or a reflecting section (for example, aluminum foil or a mirror), a remote control (a remote controller) having a light-emitting function, a light pointer, a mouse having a light-emitting function, a highlighter pen, or a marker. More specifically, when a pen, an instruction stick, or the like whose reflecting section is usually hidden and is exposed only while a button is being pressed is used, a high-brightness region is formed in the taken image by the light reflected from the reflecting section. This allows the projector 100 to grasp the instruction content such as an instruction position based on the high-brightness region. Moreover, for example, the image generating section 180 may detect the instruction position by detecting the pressure exerted by the instruction tool in the projection target region, detecting the position of the instruction tool included in the taken image, or detecting the instruction position (the position in which the light is projected) indicated by a laser pointer with the image-taking section 110. In addition, the image generating section 180 may grasp the instruction content based on, for example, the position of a finger included in the taken image in addition to the instruction position indicated by the instruction tool.

Moreover, the image displayed as the subimage is not limited to the image described above and may be, for example, an image showing text data, spreadsheet data, image data, and the like. For example, the image generating section 180 may generate an image showing the content of the text data according to an instruction for a reduced-size image of the text data. In addition, the instruction image is not limited to the instruction images 210 to 217 described above and may be, for example, an image changing a region which is different from the region in which an instruction has been performed according to a click instruction etc. by flashing light. Furthermore, the instruction information showing the instruction content and the information showing the instruction image are not limited to the taken-image information. For example, the instruction information may be operation information from a mouse, the operation information given by clicking or dragging the mouse, sound information indicating sound when a sound instruction is given, or the like. That is, the image-taking section 110 is not an indispensable component element. Moreover, for example, the information showing an instruction image may be image information showing an instruction image from the image generating section 180, image information showing an instruction image captured by a capture section, or the like.

Moreover, the computer of the projector 100 may function as the image generating section 180 etc. by reading a program product stored in an information storage medium. As such an information storage medium, a CD-ROM, a DVD-ROM, ROM, RAM, an HDD, and the like can be applied. Furthermore, the display device is not limited to the projector 100 and may be, for example, a liquid crystal monitor, a television, or the like. Moreover, the projector 100 is not limited to a single focus projector. In addition, the projector 100 is not limited to a liquid crystal projector (a transmissive liquid crystal projector, a reflective liquid crystal projector such as LCOS) and may be, for example, a projector using a digital micromirror device. Moreover, the projecting section 190 may adopt, in place of a lamp, an organic EL device, a silicon light-emitting device, and a self light-emitting device including a solid light source such as a laser diode or an LED. In addition, the function of the projector 100 may be distributed among a plurality of devices (for example, a PC and a projector).

The entire disclosure of Japanese Patent Application No. 2010-112787, filed May 17, 2010 is expressly incorporated by reference herein.

What is claimed is:

1. A display device comprising:
an image generating section generating an instruction image according to instruction content based on presentation data, which is part of said instruction content, obtained by relating image data, which is different from said instruction image, from a previously displayed image to display time data from a display time of said previously displayed image, and instruction information obtained from a currently displayed image;
a display section displaying said instruction image; and
an updating section updating said presentation data based on said instruction information,
wherein
said image generating section generates a reproduction target time specifying image including a time region which changes as time passes and a specifying region which moves along said time region according to a position shown by said instruction information, said specifying region showing a reproduction target time of said image data, and
said display section displays said reproduction target time specifying image.

2. The display device according to claim 1, wherein
said image generating section generates an image including, as said time region in said reproduction target time specifying image, a first time region whose size changes according to a reproduction time of a presentation before update by said updating section and a second time region whose size changes according to said reproduction time of said presentation after update by said updating section.

3. The display device according to claim 2, wherein
said second time region branches off from a position on said first time region, said position indicating a time point at which an update of said presentation was performed.

4. The display device according to claim 1, wherein
said image generating section generates a displayed image from said reproduction target time, and
said display section displays said displayed image.

5. The display device according to claim 1, wherein
said instruction information includes instructions given by using an instruction tool.

6. The display device according to claim 5, wherein
said image data includes a content of writing performed by said instruction tool in a display region of said instruction image,
said display time data includes data showing a time point at which said content of writing was written, and
said image generating section generates an image showing said content of writing as part of said displayed image from said reproduction target time.

7. A display method comprising allowing a display device to
generate an instruction image according to instruction content based on
presentation data, which is part of said instruction content, obtained by relating image data, which is different from said instruction image, from a previously displayed image to display time data from a display time of said previously displayed image, and
instruction information obtained from a currently displayed image,
display said instruction image,
update said presentation data based on said instruction information,
generate a reproduction target time specifying image including a time region which changes as time passes and a specifying region which moves alone said time region according to a position shown by said instruction information, said specifying region showing a reproduction target time of said image data, and
display said reproduction target time specifying image.

* * * * *